United States Patent [19]
Guichard et al.

[11] Patent Number: 5,193,002
[45] Date of Patent: Mar. 9, 1993

[54] APPARATUS FOR THE CODING/DECODING OF IMAGE SIGNALS

[75] Inventors: Jacques Guichard, Paris; Gérard Eude, Torcy, both of France

[73] Assignee: France Telecom Etablissement Autonome de Droit Public (Centre National d'Etudes des Telecommunications), Issy Les Moulineaux, France

[21] Appl. No.: 674,142

[22] Filed: Mar. 25, 1991

[30] Foreign Application Priority Data

Mar. 26, 1990 [FR] France .................. 90 03817

[51] Int. Cl.⁵ .................................. H04N 7/12
[52] U.S. Cl. .................. 358/133; 358/135; 358/136; 358/85; 358/261.3
[58] Field of Search ........ 358/133, 135, 136, 138, 358/85, 426, 261.1, 261.2, 261.3, 427; 382/56

[56] References Cited

U.S. PATENT DOCUMENTS

| | | | |
|---|---|---|---|
| 4,710,813 | 12/1987 | Wallis et al. | 358/136 |
| 4,774,587 | 9/1988 | Schmitt | 358/85 |
| 4,887,224 | 12/1989 | Okano et al. | 358/426 |
| 4,985,768 | 1/1991 | Sugiyama | 358/136 |
| 5,062,136 | 10/1991 | Gattis et al. | 358/426 |

FOREIGN PATENT DOCUMENTS 2211691  5/1989  United Kingdom .

OTHER PUBLICATIONS

"Algorithmen und Realisierung eines ISDN-Bildtelefon-Codecs", NTZ-Nachrichtentechnische Zeitschrift, vol. 42, No. 3, Mar. 1989 pp. 130-133, F. May.
"Ein Lösungsweg zur Übertragung von Bewegtbildern im Schmalband-ISDN", Frequenz, vol. 43, No. 3, Mar. 1989, pp. 70-78, H. Amor et al.
"Video-Codec und Endgeräte für das ISDN-Bildtelefon", NTZ-Nachrichtentechnische Zeitschrift, vol. 42, No. 3, Mar. 1989, pp. 136-138, 140-142, 144, 145, D. Biere et al.
"A 24bit DSP for motion video codec and software development support system", ICASSP 89, vol. 3, May 23-26, 1989, T. Murakami et al. pp. 1929-1932.

*Primary Examiner*—James J. Groody
*Assistant Examiner*—Michael H. Lee
*Attorney, Agent, or Firm*—Oblon, Spivak, McClelland, Maier & Neustadt

[57] ABSTRACT

An apparatus for coding/decoding image signals processes sequential information signals in real time so as to compress the volume of data necessary for representing the corresponding image resulting in a minimum bit rate for transmission of the corresponding image using a transmission network. The coding/decoding apparatus includes a coding arrangement for coding image signals to be transmitted as well as a decoding arrangement for decoding the image signals received. The coding arrangement includes a local image coding loop for images broken down into blocks including a coder incorporating a transformation and quantization arrangement for coding the difference between each block of a local image and the corresponding block of a preceding local image. A decoder of the local image coding loop incorporates a reverse transformation and reverse quantization arrangement for reconstituting each block. The decoding arrangement for decoding the image signals received comprises the decoder of the local image coding loop so as to ensure the decoding of local image blocks and the decoding of the remote image blocks.

8 Claims, 4 Drawing Sheets

APPARATUS FOR THE CODING/DECODING OF IMAGE SIGNALS

BACKGROUND OF THE INVENTION

1. Field of the Invention

The present invention relates to an apparatus for the coding/decoding of image signals. The invention relates to an apparatus making it possible to process in real time sequential information signals, such as video signals, with a view to compressing the volume of the data necessary for representing the corresponding image, so as to transmit it with a minimum bit rate using a transmission network.

The apparatus according to the invention is more particularly usable in television, picture conference or picturephones. It is also usable for slow variation images as in remote monitoring.

2. Discussion of the Background

With respect to the image compression methods, reference can e.g. be made to the article which was published in Echo des Recherches, No. 126, fourth quarter 1986 and entitled "L'image numerique et le codage". Reference can also be made to EP-A2-84 4270, EP-A2-123 456 and U.S. Pat. No. 4,185,188, which describe the different image coding systems.

In these image coding systems and in general terms in recent image coding systems maximum use is made of the time redundancy of the image signal, i.e. for coding an image account is taken of the preceding image.

It is pointed out that a first known coding type, called the interimage coding procedure consists of comparing the image to be coded with the preceding image and of only transmitting after coding information relating to that part of the image which is moving.

Another known coding type, called coding by movement estimates, consists of anticipating the movement in the image by estimating an image in view of the preceding image and of only transmitting information relating to the difference between said estimated image and the image effectively received.

Conventionally the image coding system comprises a transformation means for applying a transformation operator to said image. This transformation operation translates the image from the spatial field into the frequency field. The transformation operation can precede or follow the interimage coding or movement estimation coding applied to the image.

In practice an image is subdivided into a plurality of blocks before being processed, either by interimage or movement estimation coding, or by the transformation operator, which makes it possible to better define the parts of the image which are modified between two successive images and therefore to reduce the rate transmitted on the transmission network, because only those modified parts are coded and transmitted.

Moreover, in the case of coding by estimating the movement to be transmitted for each block or movement, said transmission consists of a displacement vector indicating the displacement of the block between the preceding image and the existing image. It is normal to break down the images into identical blocks of standard size $8 \times 8$ pixels. $16 \times 16$ pixels and sometimes $32 \times 32$ pixels. The larger the blocks, the better the compression factor, but the compression gain is lower on passing from 16 to 32 pixels and on passing from 8 to 16 pixels.

As can be seen in FIG. 1, a conventional coder-decoder comprises a coding channel OODi, DOODi for reducing the speed of an image i to be transmitted on the network TR and a decoding channel DOODj for receiving and decoding the signal corresponding to a remote image j transmitted by said network TR.

SUMMARY OF THE INVENTION

The conventional coding-decoding apparatuses of the type shown in FIG. 1 make it possible to use hybrid algorithms (i.e. algorithms combining several image compression methods, namely a prediction transformation algorithm), but they are unfortunately cumbersome due to the processing complexity required with such algorithms.

The aim of the coding-decoding apparatus according to the invention is to obviate this disadvantage. It also makes it possible to better distribute the processing operations in order to reduce the calculating tasks of certain circuits. It also makes it possible to comply with CCITT standard H261.

The present invention more specifically relates to an apparatus for the coding-decoding of image signals by prediction transformation having means for coding the image signals to be transmitted and means for decoding the image signals received, said signals being transmitted by means of a transmission network having a given speed, wherein the coding means are constituted by a coding loop for the images broken down into blocks and which has a coder incorporating transformation and identification means for coding the difference between each block of a local image and the corresponding block of the preceding local image and a decoder incorporating reverse transformation and reverse quantization means making it possible to decode each image block so as to reconstitute said blocks, so as to subtract them from the block of the following image, characterized in that the means for decoding the remote image received are constituted by the decoder of the local image coding loop, said decoder thus ensuring the decoding of the local image blocks and the decoding of the remote image blocks.

According to a second feature of the coding-decoding apparatus, the transformation and reverse transformation means are realized by the same apparatus and in the same way the quantization and reverse quantization means are also realized by the same apparatus, so that the decoding is carried out by the coder, which contributes to further decreasing the overall dimensions of the coding-decoding apparatus according to the invention.

According to another feature of the invention, the coding loop of the coder-decoder comprises a multiprocessor system, in which the processors are interconnected by bidirectional links and by a bidirectional common bus and a double buffer register for adapting the flows of the transmitted and/or received data between the apparatus and the transmission network.

According to another feature of the coding-decoding apparatus, the multiprocessor system comprises a first image memory containing the blocks of the image to be processed, a second image memory containing the blocks of the preceding image, a third image memory containing the decoded remote image blocks, a first signal processor for forming the difference between corresponding blocks read into the first and second memories, a second processor for on the one hand carrying out direct quantizations of the transformed coefficients of local image blocks and a reverse quantization of these blocks and on the other hand carrying out a reverse quantization of the received remote image blocks and a transformation device able to obtain transformed coefficients of the difference from the first processor and obtain reverse transformation of data from the second processor.

According to another feature of the coding-decoding apparatus, the multiprocessor system also comprises a third signal processor for calculating the displacement vectors between a new local image and a preceding local image, a fourth signal processor for on the one hand carrying out an entropic coding of the quantized coefficients and a coded data multiplexing in order to transmit them on the network and on the other hand demultiplex the data received and decode the entropic coding of said data.

According to another feature of the coding-decoding apparatus, the multiprocessor system also has fourth and fifth image memories, said memories respectively having a function identical to the first and second memories, the duplication making it possible to avoid access conflicts between the first and third processors.

According to another feature of the coding-decoding apparatus, the multiprocessor system has a fifth signal processor for carrying out a post-processing on the data from the third image memory and a sixth image memory for storing said data.

According to another feature, the coding-decoding apparatus also has an analog-digital converter for the local image signal to be transmitted, followed by a bidimensional filter and a digital-analog converter for the data corresponding to the remote image signal received.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
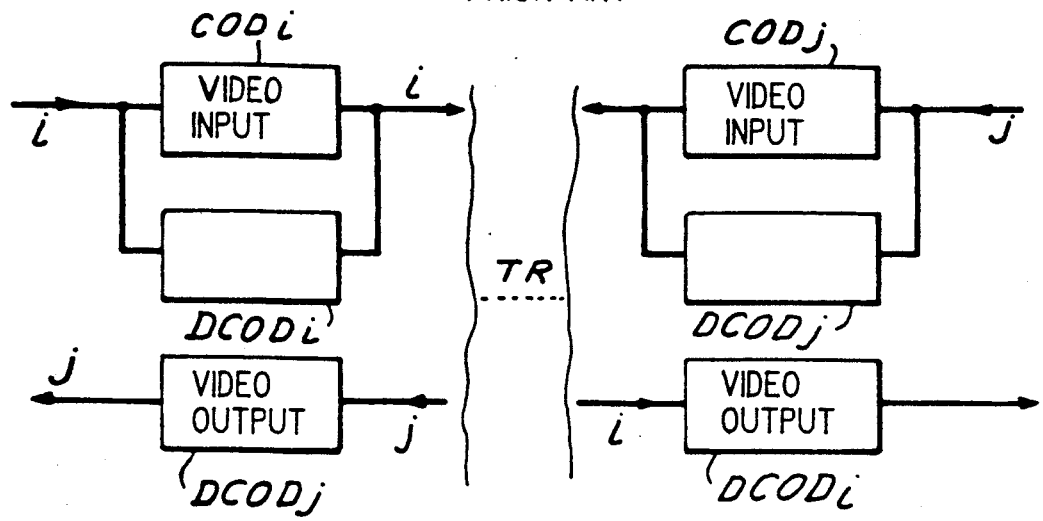
FIG. 1 A diagram of a prior art coder-decoder.

FIG. 1 shows the diagram of a prior art coder-decoder, which comprises a coding channel CODi for the image signal i from a video input and which is transmitted by a transmission network TR. This channel also has a loop in which is placed a decoder DCODi for the image i.

The coder-decoder also has a decoding channel DCODj for the images j transmitted by the transmission network TR and which are to be displayed, the image signal being taken on the video output of said decoding channel.

Throughout the remainder of the description, the term local image is understood to mean the image applied to the video input of the coding channel and which is to be transmitted for display at the end of transmission. The term remote image or remote image signal is understood to mean the signal delivered by another coding-decoding means and transmitted by the transmission network, so that, at the end of processing it is at the video output.

Figure 2:
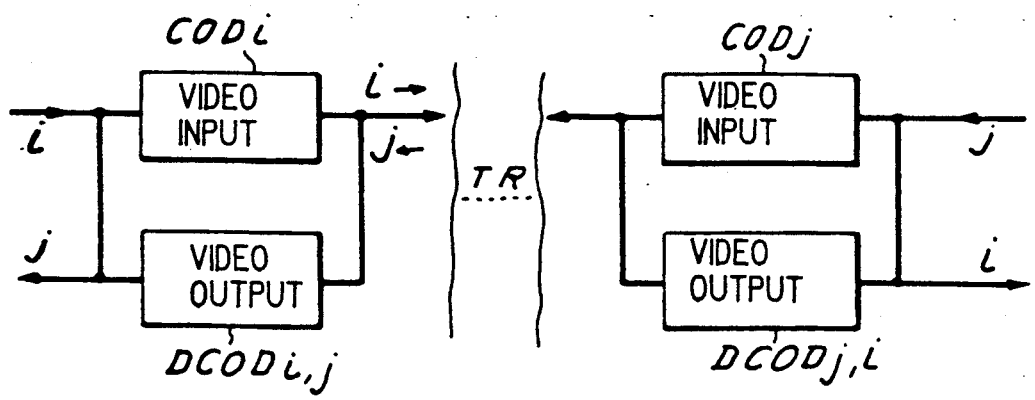
FIG. 2 A diagram of a coder-decoder according to the invention.

Therefore FIG. 2 shows the diagram of a coder-decoder according to the invention. The coder-decoder has a coding channel CODi, which receives the image signal i from the video input in order to transmit it to the transmission network TR and a decoding channel DCODi,j, which will make it possible to decode by time sharing either the local image i from the coder DCODi, or the remote image j transmitted by the transmission network.

Figure 3:
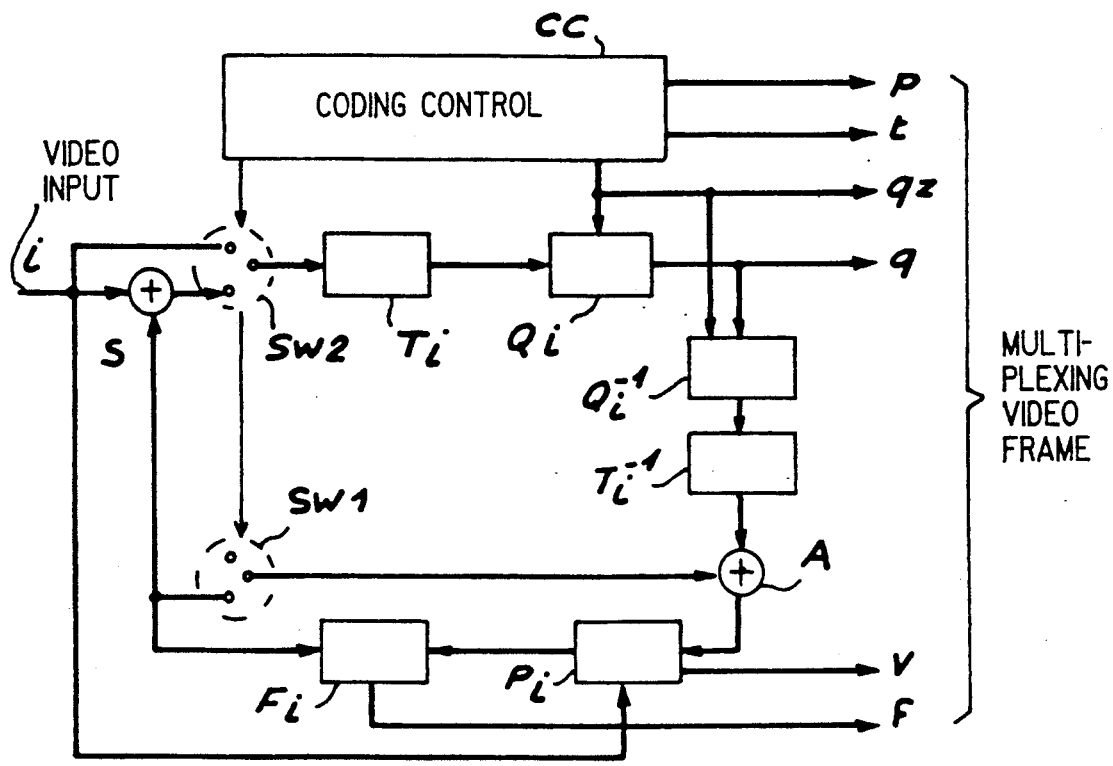
FIG. 3 A diagram of a conventional coding channel in the form of functional blocks.

FIG. 3 shows the diagram of a coder making it possible to realize a hybrid prediction transformation algorithm. This diagram is in the form of functional blocks, whereof a more detailed description can be obtained from French patent application 2 597 282. Reference can also be made to French patent application 2 589 020 for details concerning the breaking down of images into digital data blocks, the transformation of these digital data items in the frequency range by the application of an orthogonal transformation, such as a cosine transform, a Fourier, Hadamard or similar transform.

Thus, this diagram has a subtractor S connected to the video input, which receives the image signal i, followed by a transformation means Ti making it possible to transform the data corresponding to each block into a transformed coefficient.

The transformation device Ti is followed by a quantization device Q1, which makes it possible to carry out a quantization on said coefficients. The coder also has a coding loop in which reverse quantization means $Q^{-1}i$ are provided for carrying out a reverse quantization of the output signal from the quantization means Qi.

It also has reverse transformation means $T^{-1}i$, which carries out a reverse transformation on the data from the quantization means $Q^{-1}i$.

The data from said reverse transformation means are applied to an input of an adder A, whereof an output is applied to an image memory Pi followed by a loop filter Fi, whose output is applied to a second input of the subtractor S. The filter may or may not be put into operation by the means symbolized by the switch SW1.

Means symbolized by the switch SW2 also make it possible to put or not put into operation the decoding loop. Coding control means OC are provided for choosing the coding mode, i.e. put into operation or not the loop filter or the coding loop.

The decoder output signals form the frame of the signal transmitted by multiplexing to the network. The data item p represents the choice information of the coding mode of an interframe or intraframe block, t represents the transmission or non-transmission information, qz the indication information of the quantizer, q the quantization index for the transformed coefficients, v the displacement vector and f the putting into operation or not information for the loop filter.

Figure 4:
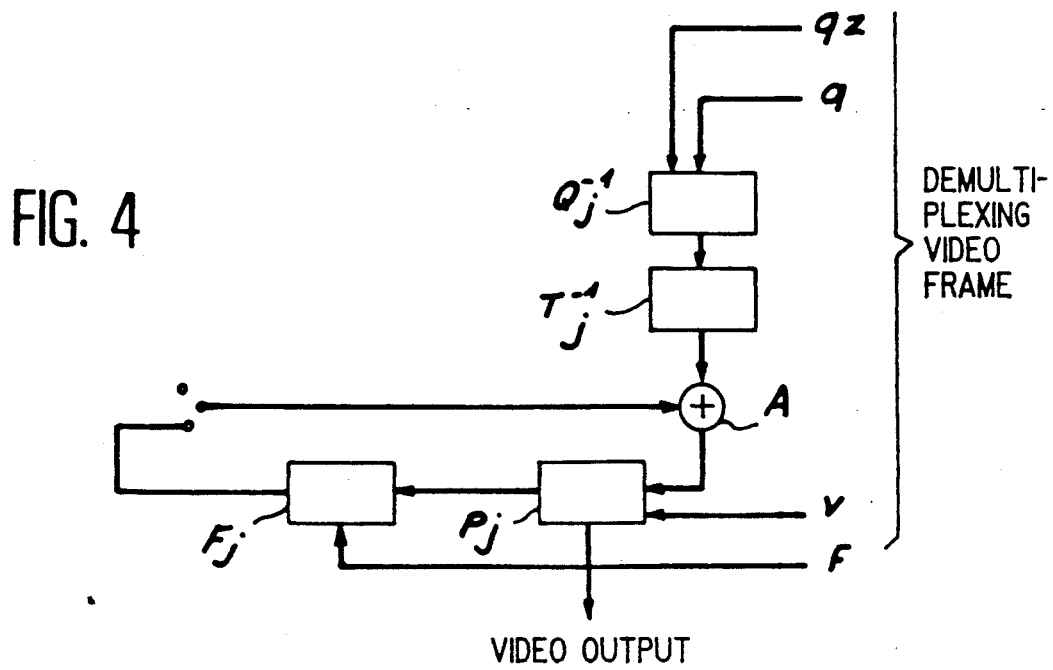
FIG. 4 A diagram of a conventional decoding channel in the form of functional blocks.

FIG. 4 shows a decoder for a remote image signal transmitted by the transmission network. This coder has a reverse quantization operator $Q^{-1}j$, which receives the indication information from the quantizer qz and the quantization index information q for the transformed coefficients. This operator $Q^{-1}j$ is followed by transformation means $T^{-1}j$, which operate the reverse transform of that applied by the line coding means by the transmission network. The output signals are applied to an input of an adder A. This adder is followed by an image memory Pj, which is followed by a loop filter Fj, which receives an information f for putting into service or not of the loop filter. The image memory Pj receives displacement vectors v.

Figure 5:
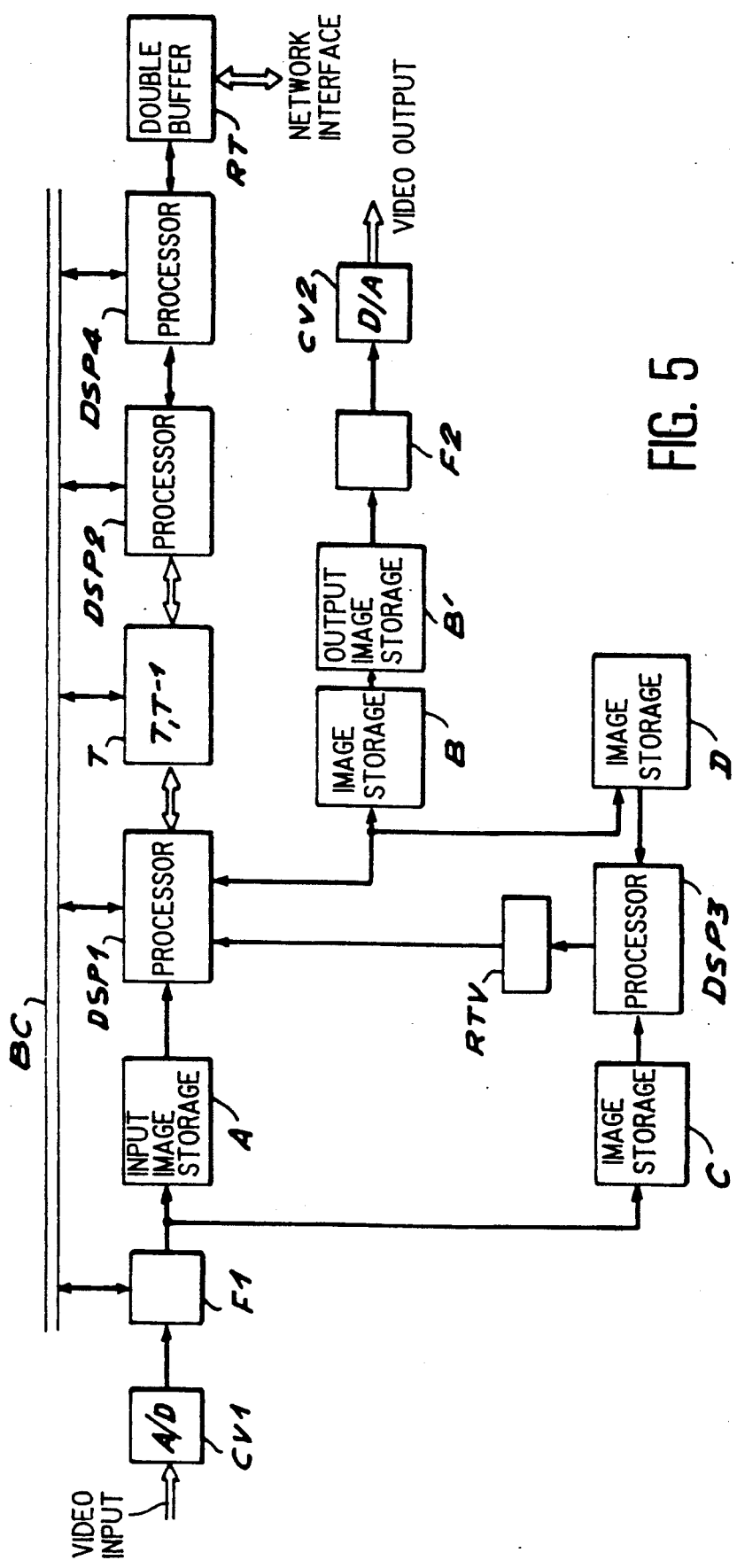
FIG. 5 The diagram of a coder-decoder according to the invention.

FIG. 5 shows an embodiment of a coder-decoder according to the invention. According to the invention, the decoding part of a received remote image, such as obtained from the functional block diagram of FIG. 4, is carried out by the decoding loop shown in FIG. 3.

Therefore, according to the invention, the coder-decoder makes it possible to code image signals with a view to reducing the speed of information to be transmitted and also carries out the local decoding of data supplied in line for reconstructing the image stored in the coding loop. This image has to be identical to the image constructed by the remote decoder. It also carries out the decoding of data arriving from the remote coder, so as to reconstruct the image supplied to the other end of the line.

In the picturephone application, the local image and the remote image are those which two remote communicating subscribers decide to transmit.

The coder-decoder according to the invention is provided with a coding loop incorporating a multiprocessor system, in which the processors are interconnected by bidirectional links and by a common bidirectional bus. The coding loop also has a double buffer register RT for adapting the transmitted and/or received data flows between the apparatus and the transmission network.

The multiprocessor system comprises a first image memory A containing the blocks of the image to be processed, a second image memory B containing the blocks of the preceding image, a third image memory B' containing the decoded remote image blocks, a first signal processor DSP1 for forming the difference between blocks which correspond to and are read into the first and second memories, a second processor DSP2 for on the one hand carrying out a direct quantization Q of the transformed coefficients of local image blocks and a reverse quantization $Q^{-1}$ of these blocks and also on the other hand carrying out a reverse quantization $Q^{-1}$ of the received remote image blocks. It also has a transformation device T, $T^{-1}$ able to obtain transformed coefficients of the difference from the first processor DSP1 and obtain the reverse transformation of the data from the second processor DSP2.

The multiprocessor system also has a third signal processor DSP3 for calculating the displacement vectors between a new local image and the preceding local image, a fourth signal processor DSP4 for on the one hand carrying out an entropic coding of the quantized coefficients and carrying out a multiplexing of the coded data to be transmitted on the network and on the other hand for demultiplexing the data received and for decoding the entropic encoding of said data.

The choice of a transformation device able to carry out the transformation T and the reverse transformation $T^{-1}$ consequently makes it possible, on the basis of the same coding device, to also carry out the decoding of said informations, which makes it possible to reduce the overall dimensions of the coder-decoder.

The choice of a multiprocessor system consequently makes it possible to distribute the tasks for the processing of the data and therefore to bring about a time gain in these processing operations.

The coder-decoder also has fourth C and fifth D image memories. These memories respectively serve a function identical to the first and second memories. Thus, they make it possible to duplicate the informations contained in the memories A and B and thus prevent access conflicts between the processors DSP1 and DSP3.

The data delivered by the processor DSP3 to the processor DSP1 transit a buffer register RTV, which consequently provisionally stores the movement vectors.

The connection between the processor DSP1 and the transformation device T, $T^{-1}$ is bidirectional. The link between the processor DSP2 and said device T, $T^{-1}$ is also bidirectional, as are the links between the processor DSP2, DSP4 and between the processor DSP4 and the buffer register RT.

The processor DSP1, the device T, $T^{-1}$, the processor DSP2 and the processor DSP4 are bidirectionally connected to a common bus BC. The buffer register RT is connected to a network interface, which is not shown, but which is of a conventional nature.

The image memory A receives image data from bidimensional filter F1, which receives the digital image signals obtained after conversion by means of an analog-digital converter CV1.

The image memory B' delivers data corresponding to the remote image and which is to be displayed to a bidimensional filter F2, which transmits said digital data to a digital-analog converter CV2 in order to allow the display of the corresponding images.

The different processing operations corresponding to picturephone application will now be described in greater detail.

Standard H261 covers rates or speeds between 48 kbt/s and 2 Mbit/s and provides two image formats: CIF and quarter CIF. The image format CIF corresponds to 360 dots × 288 lines, which makes it possible to ensure an automatic digital connection between the different regions of the world. The reduced QCIF format is appropriate for picturephone applications. The calculating power of the processors DSP1 to DSP4 makes it possible to process QCIF images, namely 180 dots × 144 lines at said frequency.

The image memories can be dimensioned for CIF format images. In the case of CIF format images, the coder processes approximately two images per second, which is acceptable for remote monitoring, but more difficult to accept for picturephone purposes, except for the display of documents. The architecture of the apparatus is unchanged, no matter what the image format chosen. Only the power of the processors has to be increased in the case of the CIF format.

The data reaching the input memory A arrive at a rate of 50 images/second. In conventional terms one image out of N is isolated, because the coder does not operate sufficiently rapidly to process all the images. According to the particular application described N equals 5.

Moreover, the line rate is approximately 60 kbit/s and does not make it possible to code all the images. For higher rates and higher calculating power levels, the previously described architecture remains valid when all the images are coded.

In a conventional manner, the images are broken down into 16 × 16 or 8 × 8 pixel blocks. The calculations are carried out by block. The processor makes it possible to calculate the displacement vectors between the new image, which is then in the image memory C, and the image contained in the memory D. These displacement vectors are then transmitted to the processor DSP1 by the bias of the register RTV. The processor DSP1 makes it possible to:

read the image block to be processed in the memory A, read the corresponding loop image block stored in the memory B, said reading being carried out at addresses displaced as a function of the displacement vectors corresponding to these blocks, optionally filtering said block, forming the difference between the previously read blocks, transmitting these differences to the transformation device.

The transform is a cosine transform in the application which is given. The processor DSP2 makes it possible to:

recover the transform coefficients at the output of the cosine transformation device T, carry out a variable thresholding on the transformed coefficients (a detailed description being provided in French patent application 88 12186), carry out direct quantization Q, transmit the quantized coefficients to the processor DSP4.

The processor DSP4 makes it possible to carry out entropic coding, i.e. allocate a code word of variable length to the coefficient (bidimensional coding) and to form the numerical frame (putting into place of image headers, groups, blocks, macroblocks).

The processor DSP2 also permits the reconstruction of the coefficients in the reverse quantization operation $Q^{-1}$ and the transmission of the reconstructed coefficients to the cosine transformation device, so that the latter carries out the reverse cosine transform $T^{-1}$.

The processor DSP1 then recovers the data from the cosine transformation device, carries out the addition with the displaced and optionally filtered blocks (coming from the memory B), which it keeps in its internal memory and writes the result (a block of of the new reconstructed image) in the memories B and D.

The operations relate to image blocks. The notion of blocks is of a conventional nature and is described in the aforementioned patent applications.

The double buffer register RT makes it possible to adapt the data flows which are constants on the networks at fixed rates to those of the coder-decoder, which are variable. These rates are obviously equal on average.

The link between the double register RT and the processor DSP4 is reversible, so is that between the processors DSP4 and DSP2. The loop memory B is duplicated, so that the latter contains the reconstructed image of the coder and the other memory, namely B', contains that of the decoder.

The data reaching the network are demultiplexed by the processor DSP4, which operates on a time sharing basis between these multiplexing and demultiplexing functions. The sharing of the tasks takes place at the level of macroblocks. The coefficients are then transmitted to the processor DSP2, which carries out the same operations as for the local decoder. When the processor DSP1 receives the data at the output of the reverse transformation, it carries out the following operations:

reading the block corresponding to the data received in the memory B1 at addresses displaced as a function of the displacement vector transmitted by the processor DSP4 by means of the common bus, possible filtering of said block, addition of the data received to the block which has just been read and optionally filtered, writing the result in the memory B'.

Figure 6:
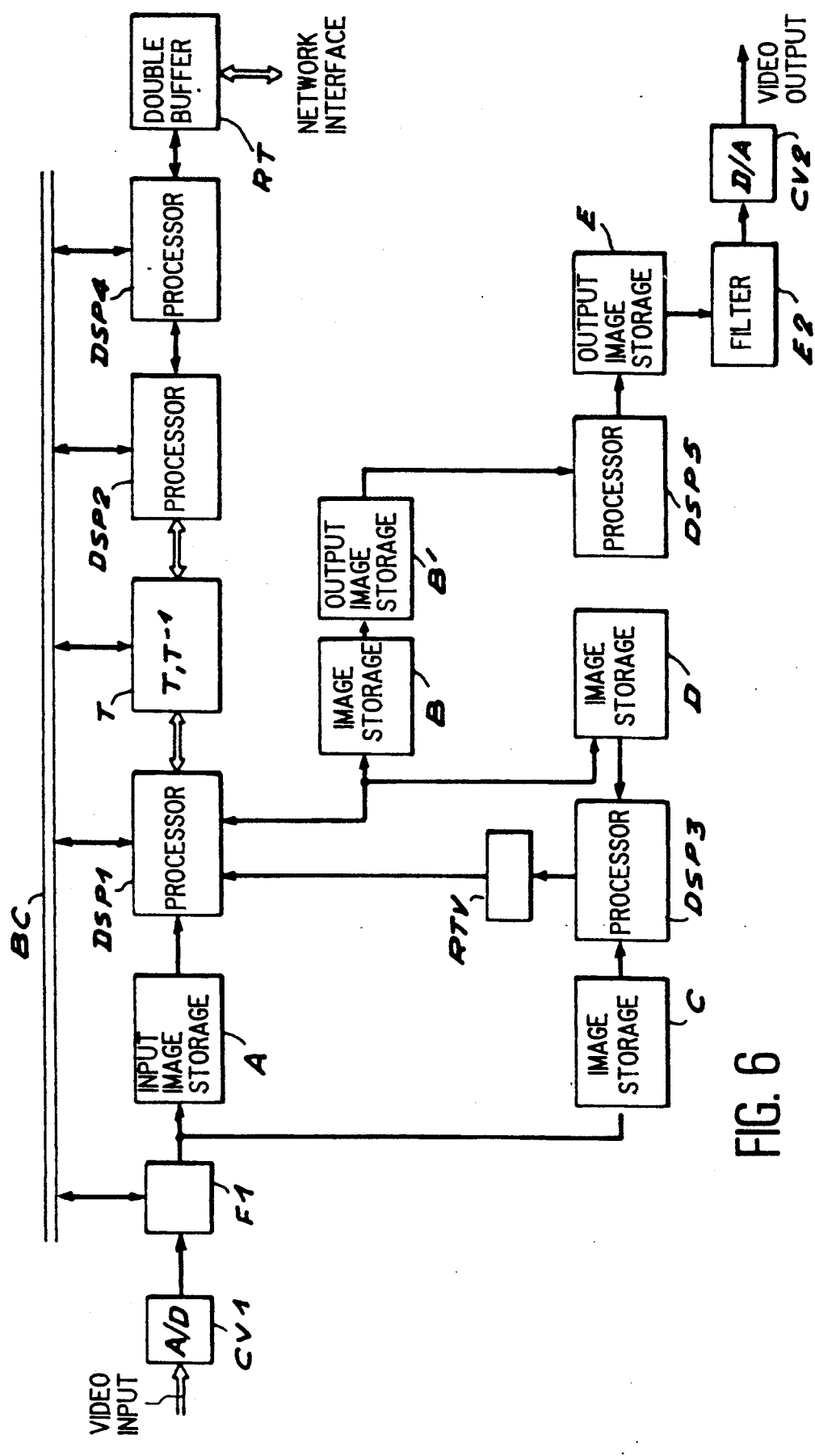
FIG. 6 A variant of the diagram of the coder-decoder according to the invention.

FIG. 6 corresponds to a constructional variant of the coder-decoder of FIG. 5 and has the same elements as the latter and carry the same references, two supplementary elements corresponding to said variant. These relate to a signal processor DSP5 and an image memory E. The signal processor DSP5 makes it possible to carry out a post-processing, whereof a description is given in French patent applications 2589020 and 2599577. The content of the memory B' can consequently be directly displayed or can be displayed via the processor DSP5 and the added image memory E.

In the two variants described, use is made of bidimensional filters F1 and F2, which are necessary in the particular application given in an exemplified manner hereinbefore for carrying out image format changes. These filters do not play any particular part in the architecture described other than that of changing the CIF and QCIF format.

The coder-decoder according to the invention makes it possible to considerably reduce the overall dimensions of the devices conventionally used in such cases. Thus, the decoding part of the local image also makes it possible to process remote images.

According to another aspect of the invention, the working load of the decoder part is better used than in conventional decoders. Thus, in the coder part, the fixed blocks, i.e. those for which all the coefficients are zero at the output of the cosine transformation device do not have to be quantized and then dequantized, etc., so that the signal processor DSP2 does nothing for these particular blocks.

However, the latter represent at least 30% of the images coded at 64 kbit/s. This reduction of the calculation load of the processor DSP2 is utilized for the processing of the blocks received (whereof at the most 70% on average are non-fixed). The working load of the processor DSP2 is consequently better utilized.

In the case of an overload (example of an entirely intra-coded image where all the blocks have to be decoded), the priority is given to the decoder which will then process the blocks of the remote image. The local image can in this case be interrupted. This leads to a delay or, at the worst, an image will be missing on the coder side. This solution is not prejudicial for display purposes.

Certain device references are given in exemplified manner for the constructions described. The processors DSP1 to DSP5 can be Motorola 56001 devices. The reverse and direct cosine transformation circuit can be a SGS THOMSON TV3200 circuit. The filters F1 and F2 are 2D ASIC filters, e.g. produced by THOMSON. The processor DSP4 can be the Texas circuit TMS320025.

Obviously, the embodiment given has only been provided in an exemplified form and the apparatus according to the invention can be produced with specific standard components in accordance with the embodiment given.

We claim:

1. An apparatus for the coding-decoding of image signals by prediction transformation having means for coding the image signals to be transmitted and means for receiving and decoding remote image signals which are the transmitted image signals, said image signals being transmitted by means of a transmission network having a given speed, wherein the coding means comprise a coding loop for the images broken down into blocks and which has a coder incorporating transformation (T) and quantization (Q) means for coding the difference between each block of a local image and the corresponding block of a preceding local image and a decoder incorporating reverse transformation ($T^{-1}$) and reverse quantization ($Q^{-1}$) means for decoding each image block so as to reconstitute said blocks, so as to subtract the image blocks from image blocks of a following image, wherein the means for receiving and decoding the remote image signals are constituted by the decoder of the local image coding loop, said decoder thus ensuring the decoding of the local image blocks and the decoding of remote image blocks.

2. An apparatus according to claim 1, where-in the transformation means (T) and reverse transformation means ($T^{-1}$) are formed by the same device, the quantization and reverse quantization means also being provided by the same device, so that decoding is carried out by the coder.

3. An apparatus according to claim 1, wherein the coder and decoder of the coding loop comprises a multiprocessor system in which a plurality of processors are interconnected by bidirectional links and by a common bidirectional bus (BC) and a double buffer register (RT) for adapting transmitted and/or received data which flows between the apparatus and the transmission network.

4. An apparatus according to claim 1, wherein the coder and decoder of the coding loop comprises a multiprocessor system including a first (A) image memory containing the blocks of the image to be processed, a second (B) image memory containing the blocks of a preceding image, a third (B') image memory containing the decoded remote image blocks, a first signal processor (DSP1) for forming the difference between corresponding blocks read into the first and second image memories, a second signal processor (DSP2) for on the one hand carrying out direct quantizations (Q) of the transformed coefficients of local image blocks and a reverse quantization ($Q^{-1}$) of these blocks and on the other hand carrying out a reverse quantization ($Q^{-1}$) of the received remote image blocks and a transformation device (T, $T^{-1}$) able to obtain transformed coefficients of the difference from the first signal processor (DSP1) and obtain reverse transformation of data from the second signal processor (DSP2).

5. An apparatus according to claim 4, wherein the multiprocessor system also comprises a third signal processor (DSP3) for calculating the displacement vectors between a new local image and a preceding local image, a fourth signal processor (DSP4) for on the one hand carrying out an entropic coding of the quantized coefficients and a coded data multiplexing in order to transmit the quantized coefficients on the network and on the other hand demultiplex received data and decode the entropic coding of said received data.

6. An apparatus according to claim 5, wherein the multiprocessor system also incorporates fourth (C) and fifth (D) image memories, said memories respectively fulfilling an identical function to the first and second image memories, the duplication making it possible to avoid access conflicts between the first and third processors (DSP1, DSP3).

7. An apparatus according to claim 6, further comprising a fifth signal processor (DSP5) for carrying out a post-processing of the data from the third image memory (B') and a sixth image memory (E) for storing said data.

8. An apparatus according to claim 1, further comprising an analog-converter (CV1) for receiving the local image to be transmitted, connected in series to a bidimensional filter (F1) for use in changing a format of the coding-decoding apparatus based on a particular application of the apparatus, and a digital-analog converter (CV2) for receiving the data corresponding to the remote image signals.

* * * * *